UNITED STATES PATENT OFFICE.

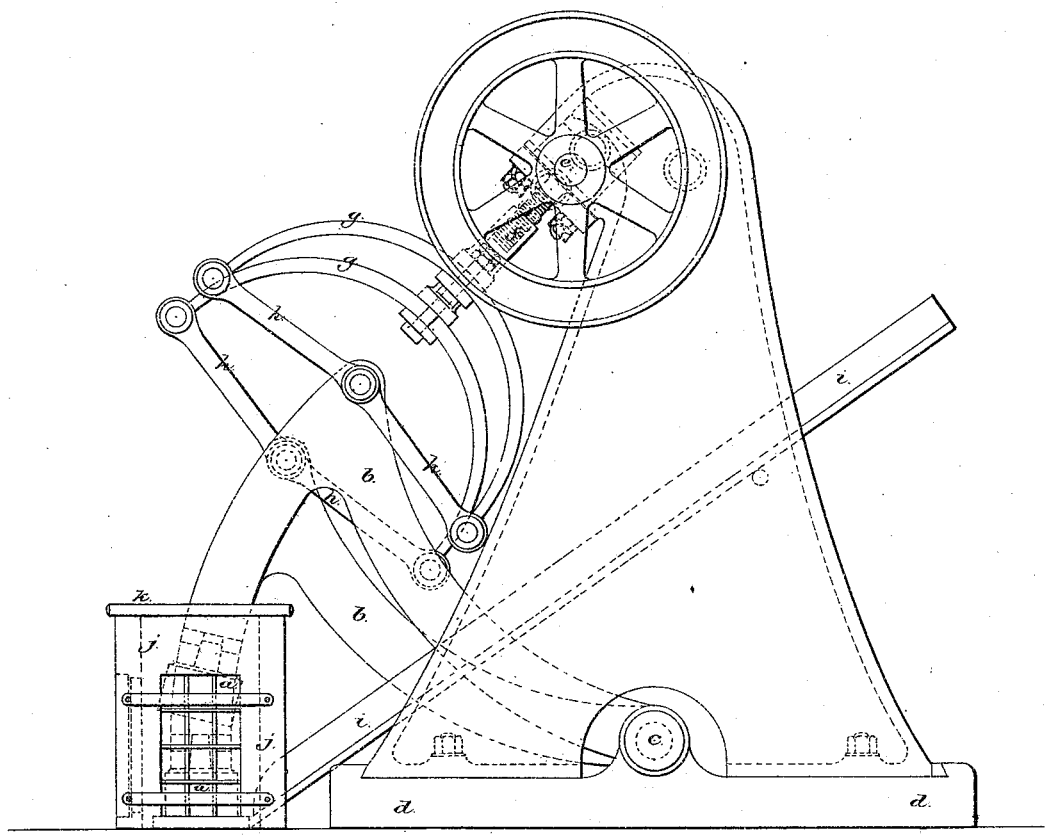

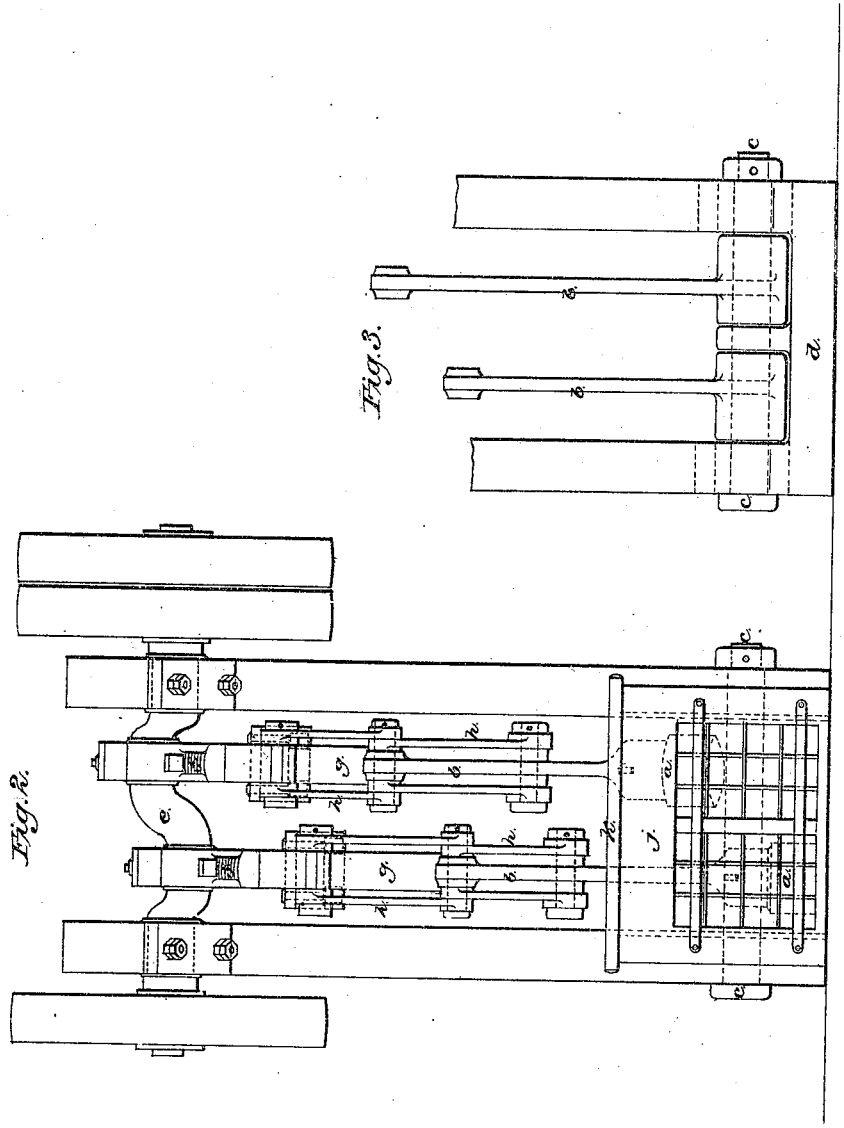

JOHN PATTERSON, OF BELFAST, IRELAND.

IMPROVEMENT IN ORE-STAMPING MACHINES.

Specification forming part of Letters Patent No. 179,725, dated July 11, 1876; application filed May 10, 1876.

*To all whom it may concern:*

Be it known that I, JOHN PATTERSON, of Belfast, in the county of Antrim, in Ireland, gentleman, have invented certain new and useful Improvements in Machines for Stamping Minerals, Metals, Animal and Vegetable Substances, and Textile Fabrics and Fibers; and I hereby declare the following to be a full, clear, and exact description thereof, reference being had to the annexed drawings, forming part of this specification.

In the stamping of minerals and metals there is much difficulty experienced, owing to the substances under operation, when finely divided, getting into the bushes or guides of the the stampers, and not only causing much increased friction, but wearing away the said bushes or guides and stamp-rods; and in stamping of animal and vegetable substances and textile fabrics and fibers great inconvenience is experienced from the dropping of the lubricating material onto the substances to be stamped.

Now, in order to overcome the above injurious effects I employ vibrating levers to transmit the motion of the crank-shaft, through springs and flexible connections, to the stampers.

Figure 1 is a side elevation of a machine for stamping minerals, metals, and animal and vegetable substances, constructed according to my invention. Fig. 2 is a front elevation of the same, and Fig. 3 is a view from the back of the machine.

*a a* are the stampers, which are connected to the levers *b b* by means of a taper shank or otherwise. The levers vibrate on the fulcrum-shaft *c*, which is supported at each end and in the center by bearings fixed to the foundation-plate *d*, as shown in Fig. 3. The feeding-trough *i* conveys the ore or other substances to the anvil, which is inclosed in the grated case *j*, provided with a cover, *k*, in which are slots to allow the levers *b* to move up and down. The stampers are worked by the crank-shaft *e*, and each crank is connected by a bridle and adjustable screw, *f*, to a spring, *g*, and the extremities of these springs are connected by the links *h* to the levers *b*.

I wish to observe here that I make no claim, broadly, to the use of the spring and flexible connections above described, as the same have been used for various purposes by Philip Syng Justice and J. W. J. and S. Willoughby and others.

When the machine is at work the stampers *a* act alternately on the ore or other substances on the anvil, and gradually stamp it, while a constant supply of water is admitted to the grated case *j*, to wash the finely-pulverized particles through the gratings in the said case.

When minerals and metals are being operated upon, the flashings are, to a great extent, confined within the grated case; but that which escapes does very little if any damage to the working parts of the machine, as the ordinary stamp-rods, bushes, and guides are dispensed with, and the fulcrum-shaft *c* of the levers *b* is removed beyond the influence of the flashings.

When my invention is applied to machines for stamping textile fabrics they are wound on a beam, as usual, and the stampers are connected to levers vibrating on a fixed center, similar to the levers *b*, above referred to.

In the machines above described a great saving in power is effected, as the friction is reduced.

Having thus stated the nature and particulars of my invention, I declare that what I claim herein as new, and desire to secure by Letters Patent of the United States, is—

The vibrating levers *b*, pivoted at one end, and carrying stamps *a* at the other, in combination with the links *h*, spring *g*, connection *f*, and crank-shaft *e*, substantially as and for the purpose described.

In testimony whereof I have hereunto set my hand before two subscribing witnesses.

JOHN PATTERSON.

Witnesses:
   WM. T. HAMILTON,
     *Clerk with John Patterson.*
   GEO. JAMISON,
     *Clerk with John Patterson.*